(12) United States Patent  
Biggers et al.

(10) Patent No.: US 7,472,561 B2
(45) Date of Patent: Jan. 6, 2009

(54) AIR CONDITIONING EVAPORATOR RETAINING APPARATUS

(75) Inventors: Charles David Biggers, Grenada, MS (US); James W. Pickle, Grenada, MS (US)

(73) Assignee: Advanced Distributor Products LLC, Grenada, MS (US)

( * ) Notice: Subject to any disclaimer, the term of this patent is extended or adjusted under 35 U.S.C. 154(b) by 0 days.

(21) Appl. No.: 11/687,263

(22) Filed: Mar. 16, 2007

(65) Prior Publication Data

US 2008/0224015 A1 Sep. 18, 2008

(51) Int. Cl.
*F25D 21/14* (2006.01)
(52) U.S. Cl. .................. 62/285; 248/316.7; 248/300
(58) Field of Classification Search .......... 248/300, 248/301, 316.7, 229.16, 229.26, 316.2, 228.7, 248/231.81, 220.21, 221.11, 230.7; 62/285, 62/291
See application file for complete search history.

(56) References Cited

U.S. PATENT DOCUMENTS

| 248,315 | A | * | 10/1881 | Hodgden | .................. 131/257 |
| 1,237,456 | A | * | 8/1917 | Becker | ........................ 217/58 |
| 2,807,431 | A | * | 9/1957 | McHale | ...................... 248/113 |
| 3,295,812 | A | * | 1/1967 | Schneider et al. | ...... 248/229.16 |
| 5,910,351 | A | * | 6/1999 | Davis et al. | ................. 428/100 |
| 6,357,713 | B1 | * | 3/2002 | BeBow | ........................ 248/300 |
| 6,378,828 | B1 | * | 4/2002 | Valiulis et al. | ......... 248/231.81 |
| 6,543,737 | B2 | * | 4/2003 | Decker et al. | ............ 248/316.1 |
| 6,953,259 | B2 | * | 10/2005 | Parsons et al. | ............. 362/191 |
| 7,017,876 | B1 | * | 3/2006 | LeCher | ........................ 248/300 |
| 7,073,757 | B2 | * | 7/2006 | Johnson et al. | .......... 248/205.1 |
| 2004/0159756 | A1 | * | 8/2004 | Albertson | ................ 248/227.1 |

\* cited by examiner

*Primary Examiner*—Ramon O Ramirez
(74) *Attorney, Agent, or Firm*—David W. Carstens; Carstens & Cahoon, LLP

(57) ABSTRACT

The present invention provides a retaining clip for securing an air conditioning evaporator coil to a drain pan. The retaining clip has a U-shaped body formed from a single piece of material, wherein parallel panels for the sides of the U. One side of the U is longer than the other. A tab is formed from the end of the side panel that constitutes the longer side of the U, wherein the tab points toward the center of the U and is approximately perpendicular to the sides of the U. The retaining clip is mounted over a side wall of the drain pan, with the tab securing the clip in place by fitting underneath a section of the drain pan wall that projects outward from the general plane of the wall.

4 Claims, 12 Drawing Sheets

US 7,472,561 B2

AIR CONDITIONING EVAPORATOR RETAINING APPARATUS

TECHNICAL FIELD

The present invention relates generally to heating ventilation and air conditioning (HVAC) systems, and more specifically to a clip for attaching the coil to a drain pan.

BACKGROUND OF THE INVENTION

Houses with central air conditioning typically have what is called a split system. The split system consists of two primary components: 1) the evaporator coil inside the house, and 2) the condensing unit outside of the house. These two components are connected with refrigerant lines.

FIG. 1 shows a typical HVAC system found in most residential homes. In a typical air conditioning system, a refrigerant circulates through a loop of copper tubing 101 that runs between the outdoor condenser coil 102 and the indoor evaporator coil 103. The refrigerant traveling between the two coils absorbs heat from the inside room and releases it outside. In the process, the refrigerant cools the evaporator coils.

Typically the evaporator coil 103 is located inside the housing of a furnace 120. It is made up of refrigerant piping loops and usually designed in an A-shape, as shown in FIG. 1. The furnace blower 105 blows air across and through the evaporator coil 103, and the refrigerant loops cool the air as it passes through the coil, causing water vapor in the air to condense to liquid and collect on the coil. The condensate then drips into a drain pan 104 located under the evaporator coil 103.

The drain pan 104 is usually built into the unit by the manufacturer. There is a condensate line 106 connected to the outlet hole in the drain pan. This condensate drain line is piped to either a floor drain or to the outside. Many times instead of a pipe, a hose is used for the condensate drain line.

All HVAC coil manufacturers use some type of clip for attaching the coil to the drain pan. However, existing clips do not lock into place and eventually pull apart under mechanical load. Therefore, it would be desirable to have a retaining clip for the drain pan that locks into place and is more resistant to load than current designs.

SUMMARY OF THE INVENTION

The present invention provides a retaining clip for securing an air conditioning evaporator coil to a drain pan. The retaining clip has a U-shaped body formed from a single piece of material, wherein parallel panels for the sides of the U. One side of the U is longer than the other. A tab is formed from the end of the side panel that constitutes the longer side of the U, wherein the tab points toward the center of the U and is approximately perpendicular to the sides of the U. The retaining clip is mounted over a side wall of the drain pan, with the tab securing the clip in place by fitting underneath a section of the drain pan wall that projects outward from the general plane of the wall.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
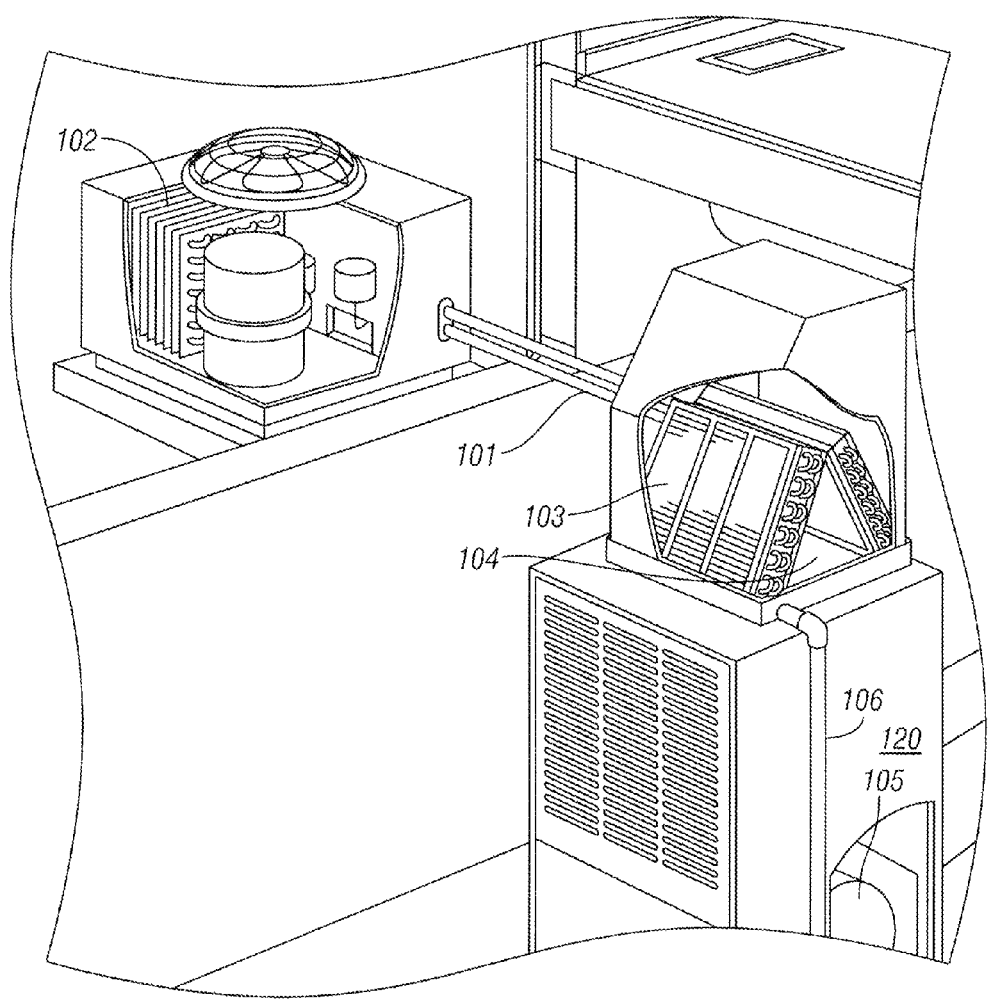
FIG. 1 shows a typical HVAC system found in most residential homes.
Figure 2A:
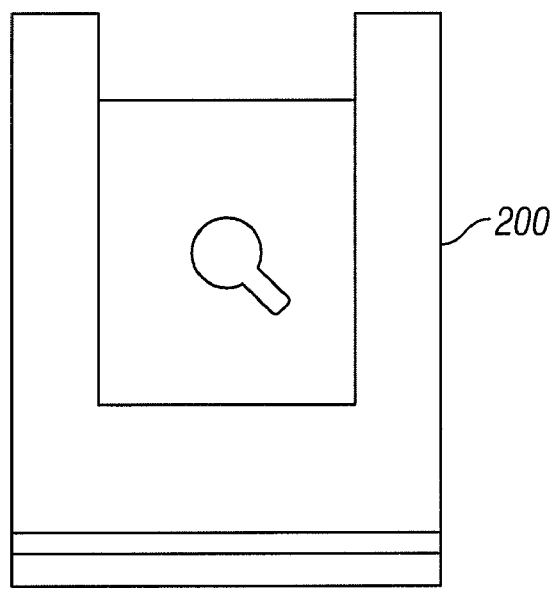
FIG. 2A shows a front plan view of a retaining clip in accordance with the prior art.
Figure 2B:
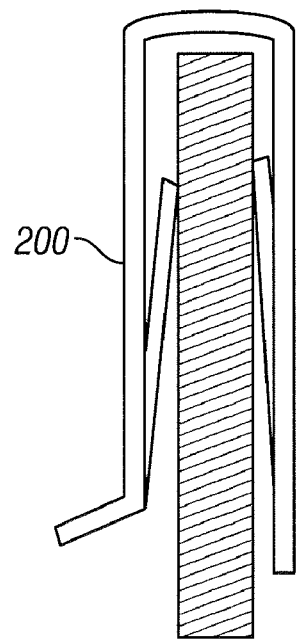
FIG. 2B is a cross section view of a prior art retaining clip mounted on a drain pan wall.

FIG. 2A shows a front plan view of a retaining clip in accordance with the prior art. FIG. 2B is a cross section view of a prior art retaining clip mounted on a drain pan wall. The retaining clip 200 mounts on the side of the drain pan and is used to secure a coil in place to ensure that condensate from the evaporator coils drains into the drain pan.

Figure 3:
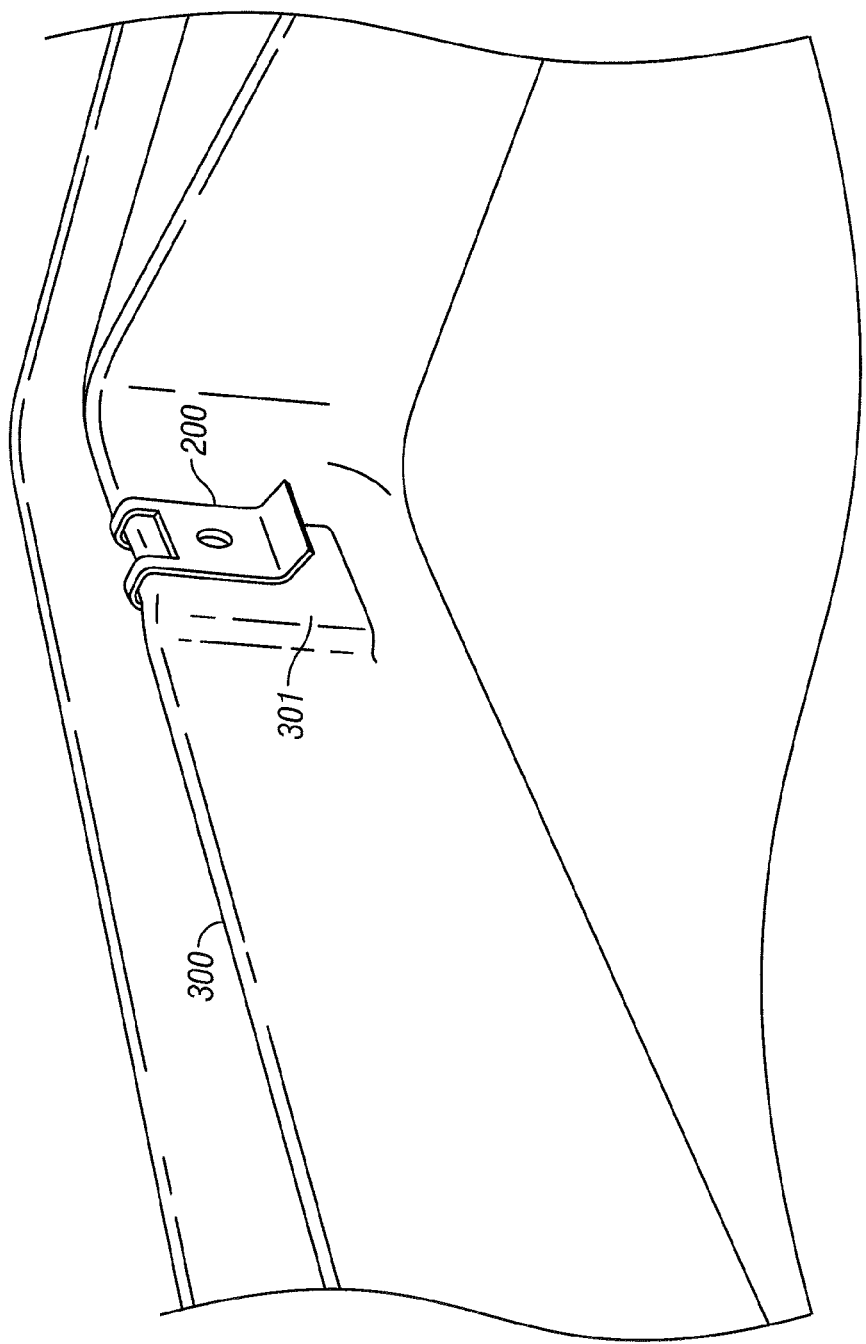
FIG. 3 is a perspective view of the prior art retaining clip mounted on the inner wall of a drain pan.

FIG. 3 is a perspective view of the prior art retaining clip mounted on the inner wall of a drain pan. As can be seen in the figure, the inner wall 300 of the drain pan has a raised portion 301 over which the retaining clip 200 is mounted. Unfortunately, under mechanical load the retaining clip 200 may twist and buckle about the axis of its retaining screw. Eventually, the retaining clip 200 may pull apart, resulting in possible water leakage from the evaporator coils.

Figure 4:
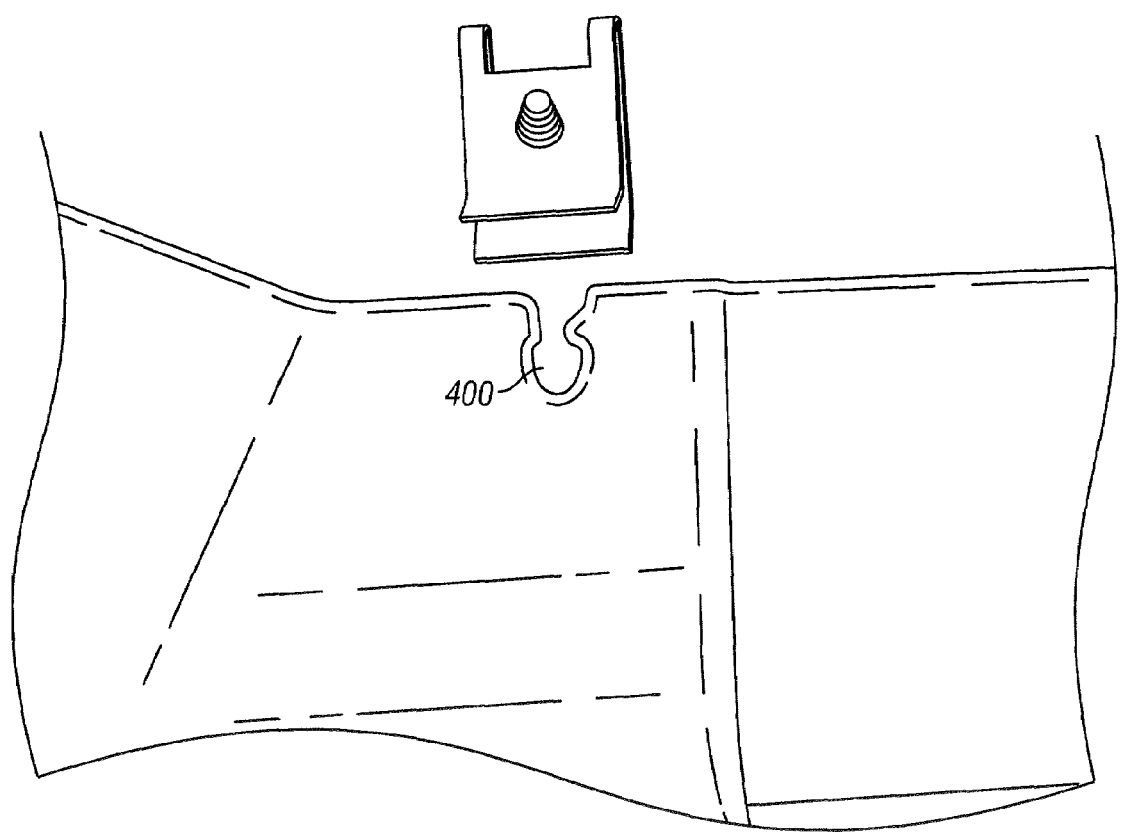
FIG. 4 shows a prior art retaining clip that has torn away from the drain pan.

FIG. 4 shows a prior art retaining clip that has torn away from the drain pan. In this example, the retaining screw 410 of the clip has torn through the wall of the drain pan, leaving a gash 400 in the wall. By tearing through the wall of the drain pan in such a manner, the prior art retaining clip allows the evaporator coil to separate from the drain pan.

Figure 5A:
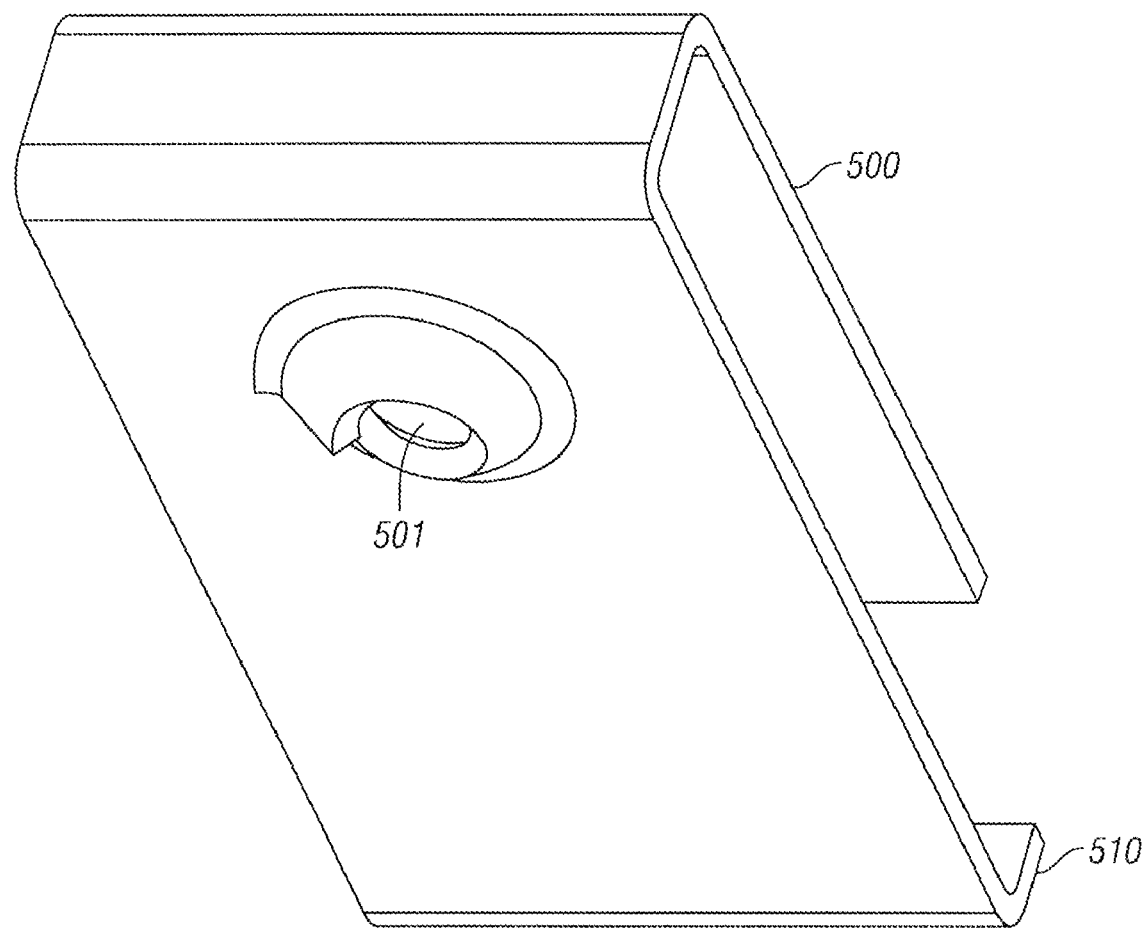
FIG. 5A is a perspective view of a retaining clip in accordance with a preferred embodiment of the present invention.
Figure 5B:
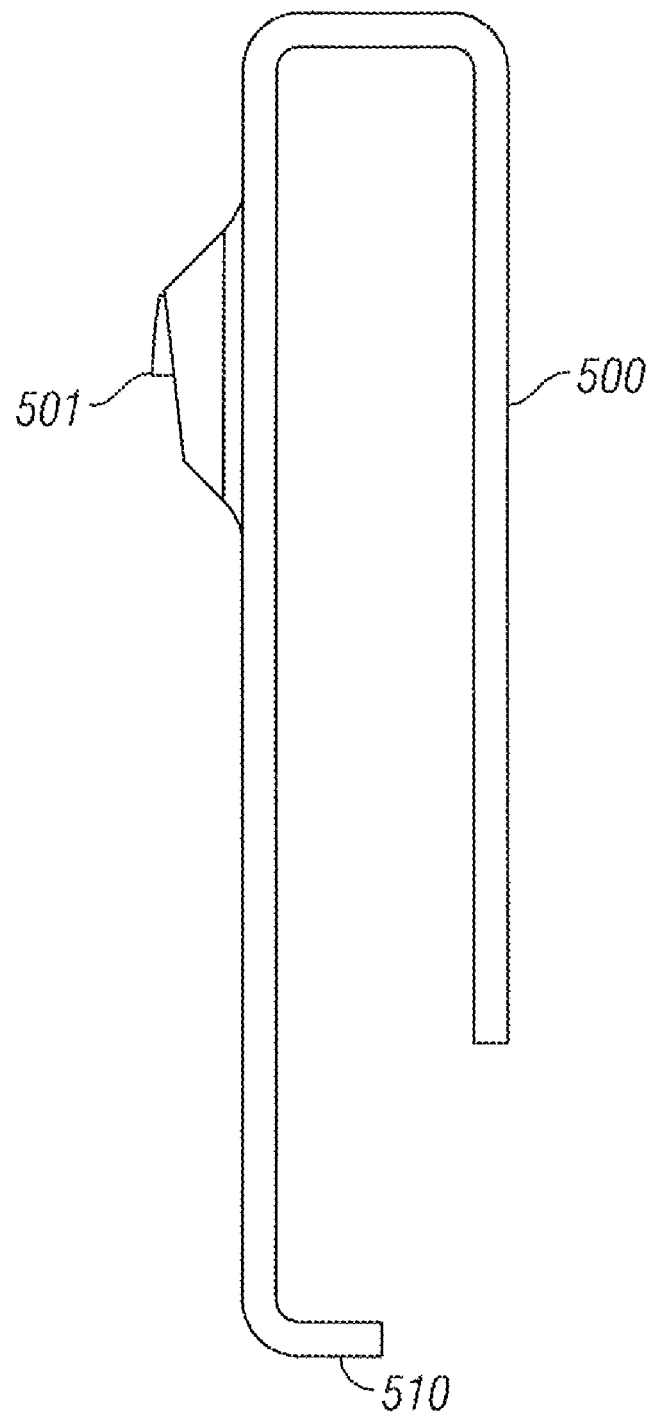
FIG. 5B is a side plan view of the retaining clip in accordance with the present invention.

FIG. 5A is a perspective view of a retaining clip in accordance with a preferred embodiment of the present invention. FIG. 5B is a side plan view of the retaining clip in accordance with the present invention. The retaining clip 500 of the present invention has a "U" bend design that has one end 510 angled inward, rather than flared out as in the prior art (contrast with FIG. 2B). This inward tab is able to fit tightly underneath the "outcropping" of the drain pan wall onto which the retaining clip 500 is mounted. Both panels of the clip have a hole 501, 502, respectively, for accommodating a tightening screw. (Hole 502 is visible in FIGS. 6B and 7A). In the preferred embodiment, the clip 500 is formed from a single piece of material. The retaining clip can be made from metal as well as high strength plastic or other types of synthetic resins.

Figure 5C:
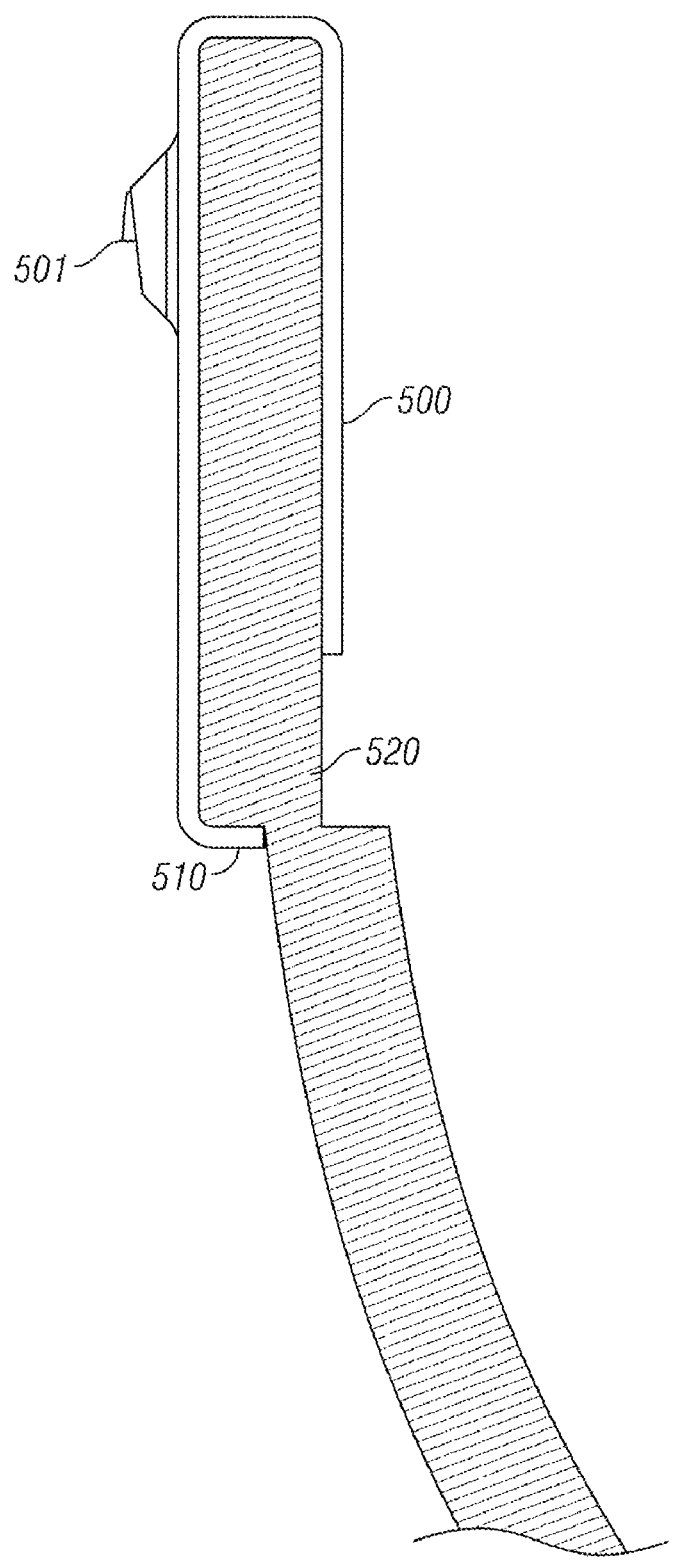
FIG. 5C is a cross section view of a retaining clip mounted on a drain pan wall in accordance with the present invention.

FIG. 5C is a cross section view of a retaining clip mounted on a drain pan wall in accordance with the present invention. This view clearly illustrates how the inward tab 510 fits under the outcropped section 520 of the drain pan wall, securing the retaining clip in place.

The design of the present invention overcomes the chief disadvantage of the prior art clip, which relies on the retaining screw as the sole means for securing the retaining clip in place in addition to holding the evaporator coil. By securing the inward tab 510 under the outcrop section 520, much of the static mechanical load on the retaining clip is transferred to the wall of the drain pain, rather than the retaining screw.

Figure 6A:
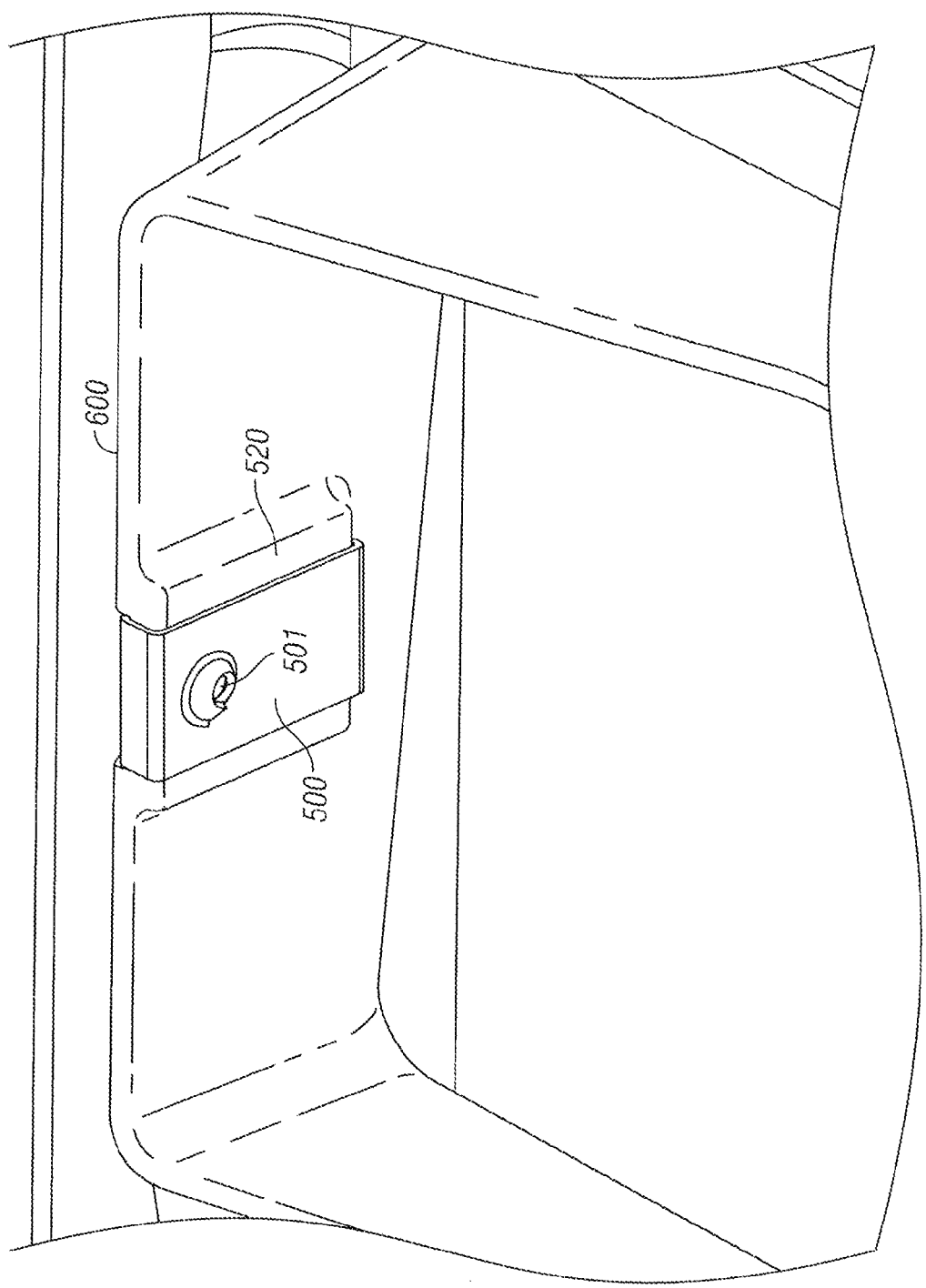
FIG. 6A is an inside perspective view of a retaining clip mounted on a drain pan in accordance with the present invention.

FIG. 6A is an inside perspective view of a retaining clip mounted on a drain pan in accordance with the present invention. This view shows the side of the retaining clip 500 that faces toward the inside of the drain pan 600. Also visible is the outcropped section 520 of the drain pan wall. From this perspective, one can see how the inward clip fits underneath the outcropping 520 and is obscured from view.

Figure 6B:
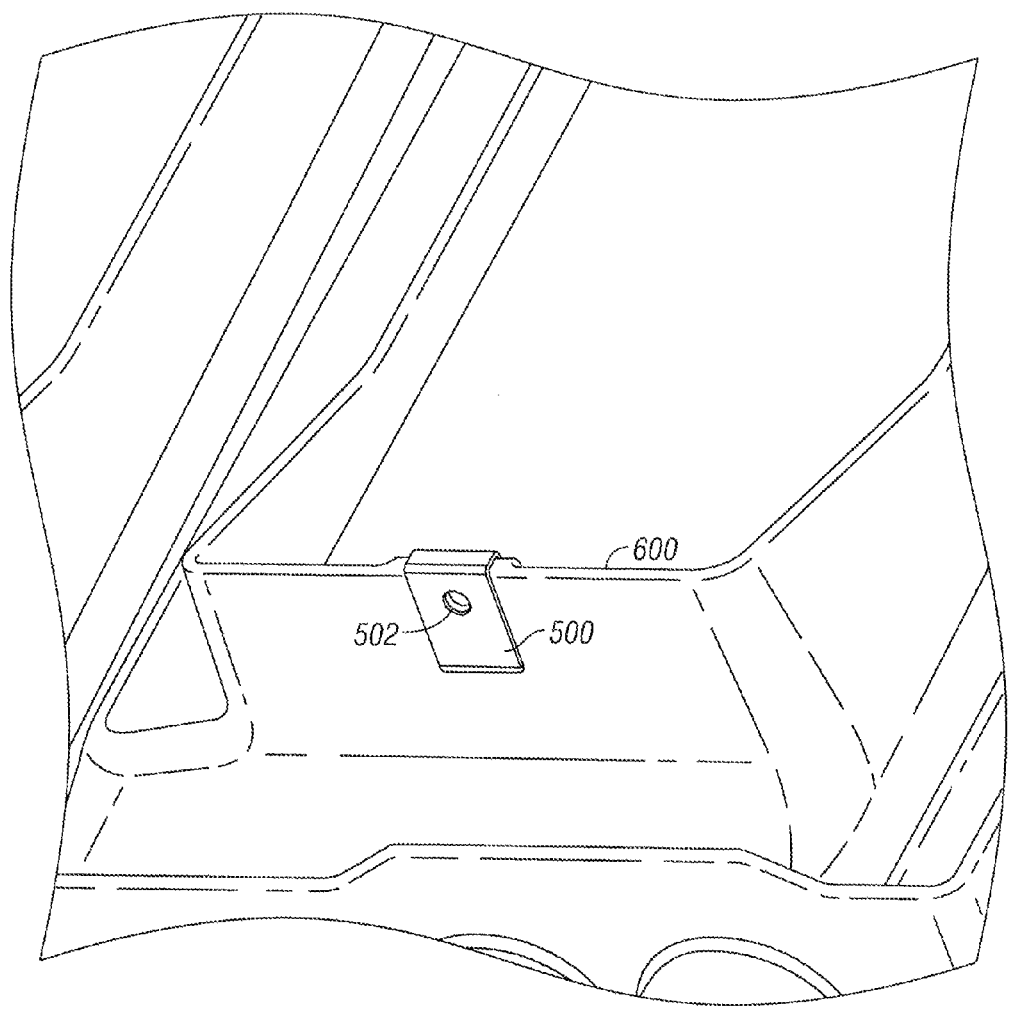
FIG. 6B is an outside perspective view of a retaining clip mounted on a drain pan in accordance with the present invention.

FIG. 6B is an outside perspective view of the retaining clip mounted on a drain pan in accordance with the present invention. This view shows how the outcropped section allows the back of the retaining clip 500 to be flush with drain pan wall. Also visible is the hole 502 in the clip 500 for the securing screw.

Figure 7A:
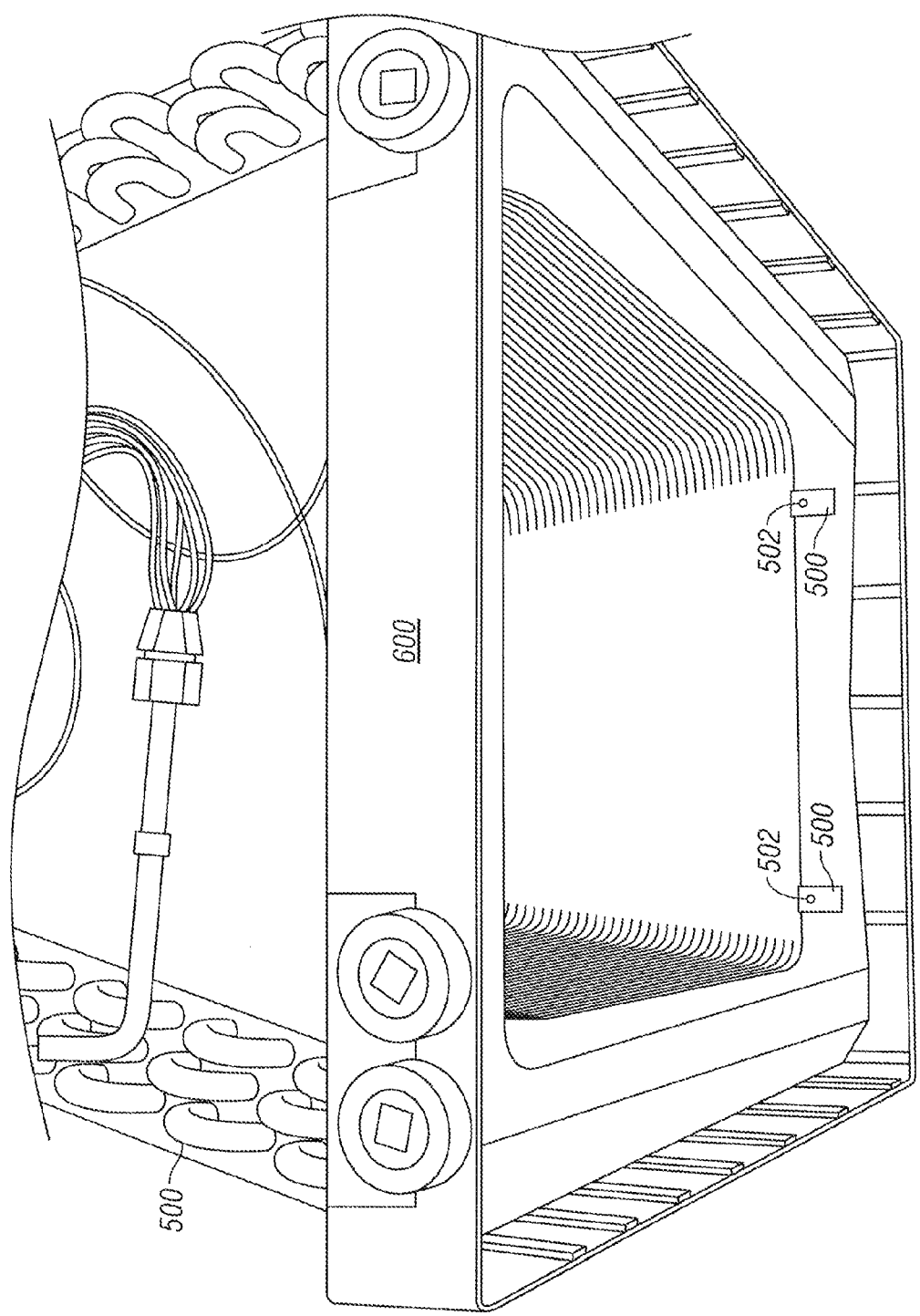
FIG. 7A shows an underside perspective view of an evaporator coil secured to a drain pan by retaining clips in accordance with the present invention.

FIG. 7A shows an underside perspective view of an evaporator coil secured to a drain pan by retaining clips in accordance with the present invention. This figure includes the major components of the evaporator assembly. From this perspective one can see how the retaining clips 500 secure the bottom of the evaporator coil A frame 700 to the drain pan 600.

Figure 7B:
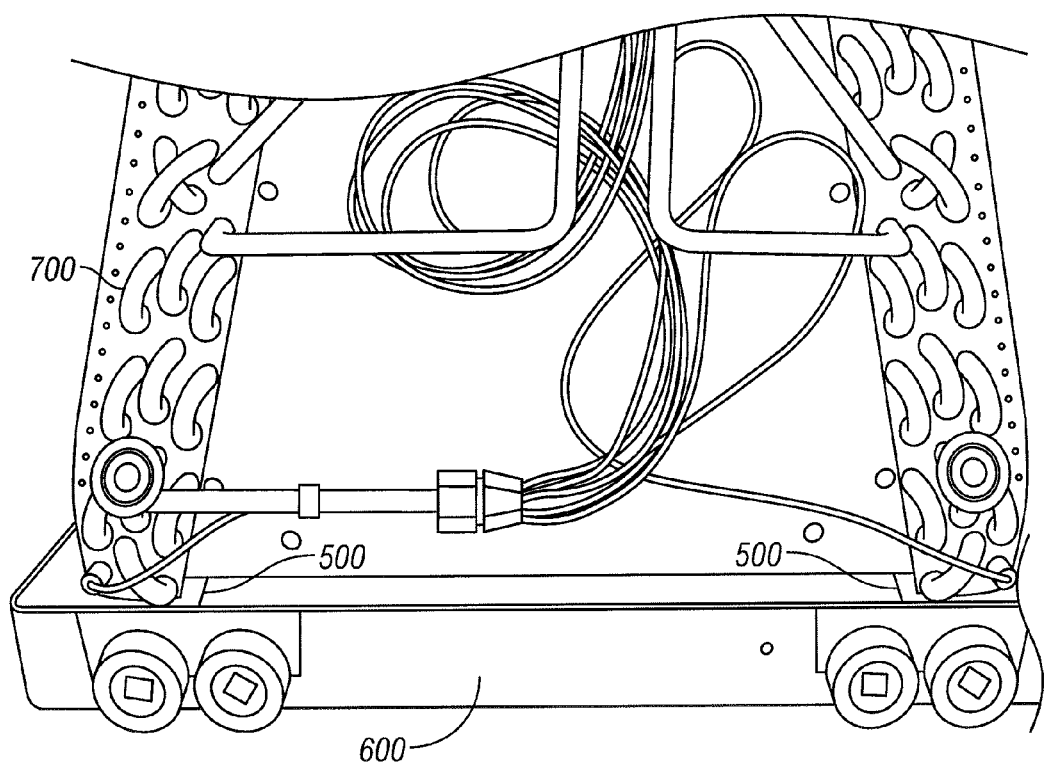
FIG. 7B shows a topside perspective view of an evaporator coil secured to a drain pan by retaining clips in accordance with the present invention.

FIG. 7B shows a topside perspective view of an evaporator coil secured to a drain pan by retaining clips in accordance with the present invention.

Figure 8:
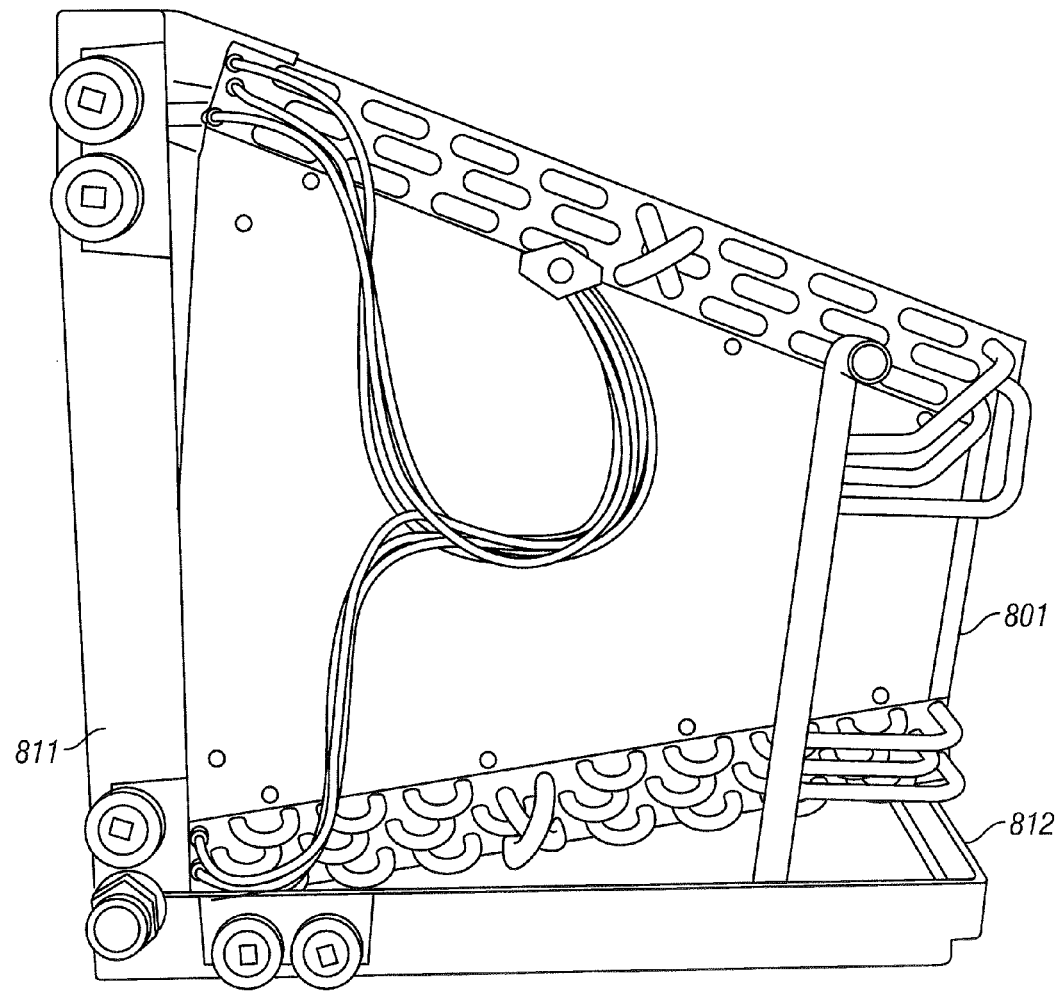
FIG. 8 shows an evaporator mounted horizontally in accordance with an embodiment of the present invention.

FIG. 8 shows an evaporator mounted horizontally in accordance with an embodiment of the present invention. The retaining clip of the present invention is most useful in preventing the separation of coil from drain pan when the evaporator 801 is installed in a horizontal application, as depicted in FIG. 8. Obviously, this configuration requires a modified drain pan design different from that used with traditional vertical evaporator set ups.

In this embodiment, there are two drain pans connected to the evaporator 810, a vertical pan 811 and a horizontal pan 812. The vertical drain pan 811 obviously does not collect the water but sits in the horizontal pan 812 that collects the water. The vertical pan 811 helps channel condensate to the horizontal pan 812. Airflow is through the vertical pan 811, which locks the evaporator 801 in position for horizontal application The retaining clip (not visible in this view) keeps the coil 801 positioned in the vertical pan 811.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. An air conditioning evaporator retaining apparatus comprising:
   (a) an evaporator coil;
   (b) a drain pan that has at least one outcropping that projects outward from the general plane of a side wall of the pan; and
   (c) at least one retaining clip with an approximately U-shaped body, wherein the sides of the U are formed from approximately parallel panels, wherein one side of the U is longer than the other and has a tab formed at its end which points toward the center of the U and is approximately perpendicular to the sides of the U
   (d) wherein the retaining clip secures said evaporator coil to said drain pan and is mounted over a side wall of the drain pan, wherein said tab secures the retaining clip in place by fitting underneath said outcropping of the drain pan wall, wherein static mechanical load on the retaining clip is transferred to the wall of the drain pain.

2. The retaining clip according to claim 1, wherein the clip is formed from a single piece of material.

3. The retaining clip according to claim 1, wherein both panels have a hole for accommodating a tightening screw.

4. The retaining clip according to claim 1, wherein the retaining clip secures the evaporator coil in a horizontal position, wherein the base of the evaporator coil is secured to the drain pan in the vertical plane, and wherein a second drain pan is placed under the evaporator coil in the horizontal plane.

\* \* \* \* \*